United States Patent [19]

Davidson et al.

[11] 4,225,226

[45] Sep. 30, 1980

[54] LASER GUIDANCE SYSTEM FOR CROP SPRAYING AIRCRAFT

[75] Inventors: Richard W. Davidson, Vandalia, Ohio; Joseph F. Rando, Cupertino, Calif.; Ted L. Teach, Dayton, Ohio

[73] Assignee: Spectra-Physics, Inc., Mountain View, Calif.

[21] Appl. No.: 974,369

[22] Filed: Dec. 29, 1978

[51] Int. Cl.$^3$ .................... G01C 3/00; G01C 21/00
[52] U.S. Cl. .................... 356/1; 356/141; 356/152; 364/449; 364/456
[58] Field of Search .......... 340/27 NA; 356/4, 5, 356/141, 152, 1; 364/456, 449

[56] References Cited

U.S. PATENT DOCUMENTS

| | | | |
|---|---|---|---|
| 3,000,256 | 9/1961 | Hyde | 356/1 |
| 3,530,468 | 9/1970 | Hannan | 356/1 |
| 3,620,626 | 11/1971 | Daly et al. | 356/4 |
| 3,671,963 | 6/1972 | Assouline et al. | 340/27 NA |
| 3,687,556 | 8/1972 | Price et al. | 356/152 |
| 3,698,816 | 10/1972 | Lutchansky | 340/27 NA |
| 3,711,203 | 1/1973 | Sato et al. | 356/152 |
| 3,788,748 | 1/1974 | Knight et al. | 356/141 |
| 3,897,151 | 7/1975 | Lecroy | 356/5 |
| 4,123,165 | 10/1978 | Brown et al. | 356/152 |

FOREIGN PATENT DOCUMENTS 1181162  2/1970  United Kingdom .................... 356/141

*Primary Examiner*—Stephen C. Buczinski
*Attorney, Agent, or Firm*—Wilson, Fraser, Barker, & Clemens

[57] ABSTRACT

This invention provides a method for controlling the path of a crop spraying aircraft in making repeated traverses over a field to insure that each traverse is laterally spaced from the adjacent traverse by the proper distance to assure adequate coverage of the crop land with the material being sprayed and avoiding overlapping or insufficient coverage of any portion of the crop land. In accordance with the method of the invention, the crop spraying aircraft carries a rotating laser beam transmitter and receiver, and the transmitted beam is reflected from a plurality of reflectors located on the ground at known positions relative to each other to provide successive reflections of the transmitted laser beam from which the angular positions of the aircraft relative to the reflectors may be continuously determined. After an initial pass over the field to establish the spray path, the position of the aircraft may be continuously computed by a microprocessor and an error signal generated during each subsequent pass to indicate to the aircraft operator whether the aircraft should be steered more to the right or left to stay on the desired spraying path.

4 Claims, 5 Drawing Figures

FIG. I

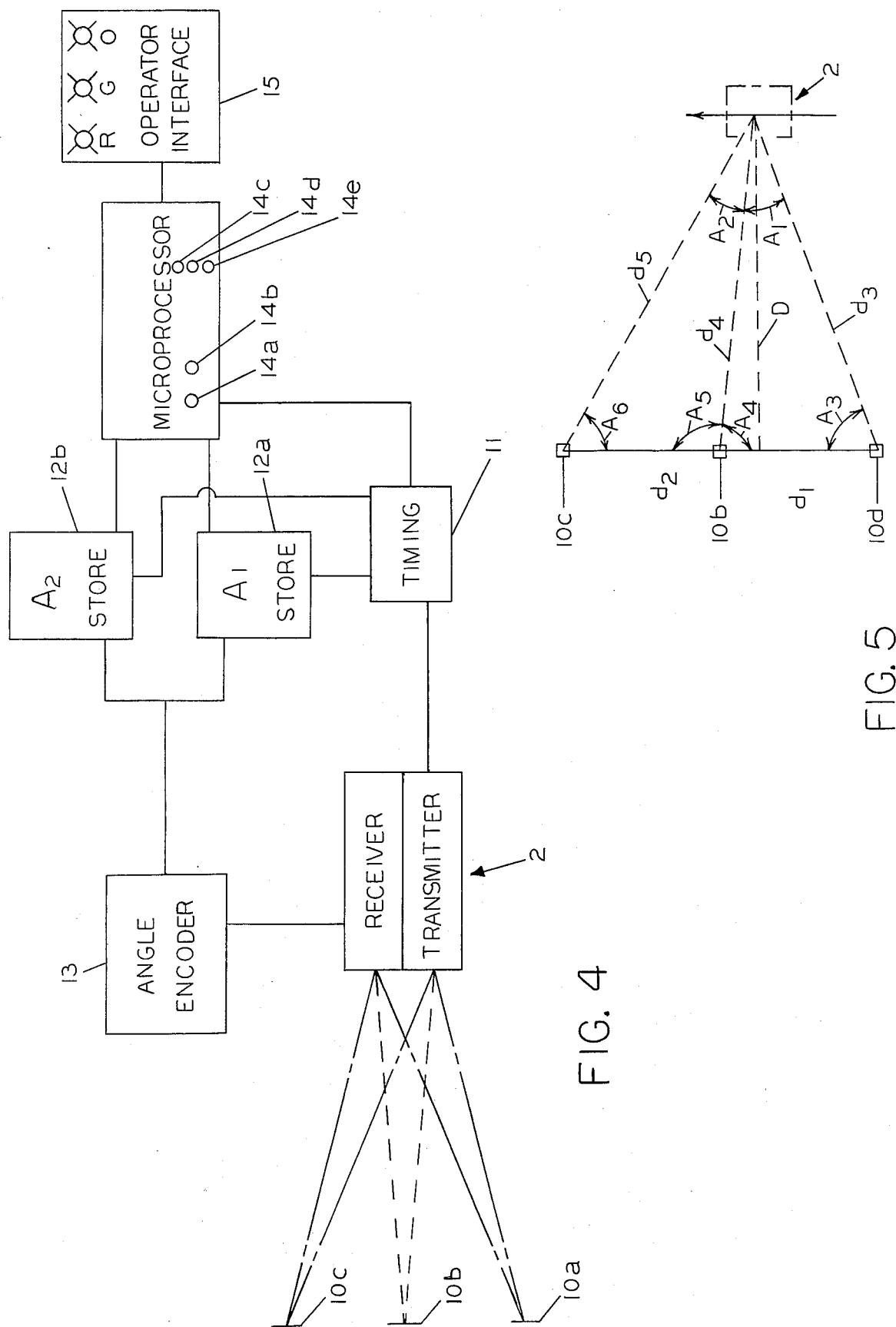

LASER GUIDANCE SYSTEM FOR CROP SPRAYING AIRCRAFT

BACKGROUND OF THE INVENTION

The utilization of low speed, low altitude aircraft for spraying both large and small acreages of field crops and orchards has been widespread in the agricultural industry. Where the size of the field is such as to require a large number of passes of the aircraft over the field in order to provide coverage, difficulty has been encountered by the aircraft operator in insuring that each of his successive passes over the field is spaced precisely with respect to the previously sprayed adjacent path in order to avoid either gaps or overlaps in spraying coverage. On small fields, guiding markers may be employed which are temporarily or permanently mounted along the field and the aircraft operator may align his craft with the guiding markers. This method, however, is entirely impractical where crop lands of several thousand acres in extent are involved so that the cost of installing and maintaining such markers becomes prohibitive. Furthermore, with such large acreages, it is very difficult for the pilot, after he has passed a marker on one end of the field to actually sight the marker on the remote end of the field and to make sure, despite existing wind conditions, that the plane is traveling on a straight line between the two markers.

Radar-type aircraft guidance systems such as used to assist planes in making landings under adverse conditions are obviously far too expensive and complicated to be utilized in an industry characterized by a large number of small companies or individual operators. Furthermore, this type of guidance system would require that the directing beacon be moved laterally after each pass by the aircraft across the field, which again presents an impractical solution to the problem.

Accordingly, the desirability of an economical crop spraying aircraft guidance system that could be carried on the aircraft and requires only simple reflector devices temporarily placed on the ground adjacent the field to be sprayed to indicate the aircraft position at any time relative to the field, is deemed to be obvious.

SUMMARY OF THE INVENTION

In accordance with this invention, the crop spraying aircraft carries a laser beam transmitting and receiving apparatus. The transmitter projects a rotating laser beam which is fan shaped in a vertical plane and continually sweeps the ground for a substantial distance around the aircraft. The rotating fan-shaped laser beam is reflected back to the aircraft by a plurality of reflectors. In the preferred embodiment of this invention, three such reflectors are utilized and they may be conveniently mounted in a line along one edge of the field at a known distance from each other. The rotating transmitted laser beam will thus produce successive beam reflections from the three reflectors which are received by suitable apparatus on the aircraft in succession. The angle between receipt of the successive reflections is measured by apparatus carried by the aircraft and, from such measurements, a microprocessor is utilized to compute the position of the aircraft. During an initial pass over the field, the position of the aircraft relative to the field and the three reflectors can be established utilizing a Cartesian coordinates based upon a line drawn through the three reflectors and a line perpendicular thereto. If the three reflectors are positioned parallel to one edge of the field to be sprayed, the aircraft operator is then really only interested in the lateral displacement of the aircraft relative to the three reflectors and, according to a program provided to the microprocessor from a suitable memory, the operator may, by actuating a suitable switch, select a traversing path that is twenty, thirty, forty, or fifty feet laterally spaced from the edge of the field for the first path and at a similar spacing for each subsequent path.

If the operator traverses the field by adjacent passes, he must necessarily make keyhole-type turns at each end of the field and this may not be desirable due to aerial obstructions in the area or high stall potential or time lost in the turn. Accordingly, the microprocessor may be programmed to provide an alternate flight path commonly called a "race track" or "oval" pattern involving successive passes at laterally spaced intervals on the order of five hundred feet or more to permit the aircraft to make a U-turn at each end of the field, but after the first pass over and back, each time returning to a path which is spaced a selected distance from the preceeding path in the same direction, thus insuring accurate spray coverage of the field.

DESCRIPTION OF THE DRAWINGS

FIG. 4 is a schematic circuit diagram illustrating the basic circuitry employed to generate a signal to the aircraft operator permitting him to direct the aircraft over the field in predetermined, accurately spaced passes.

FIG. 5 is a schematic view of the angles between lines drawn from the laser reflectors on the ground to the aircraft.

DESCRIPTION OF PREFERRED EMBODIMENTS

Figure 1:
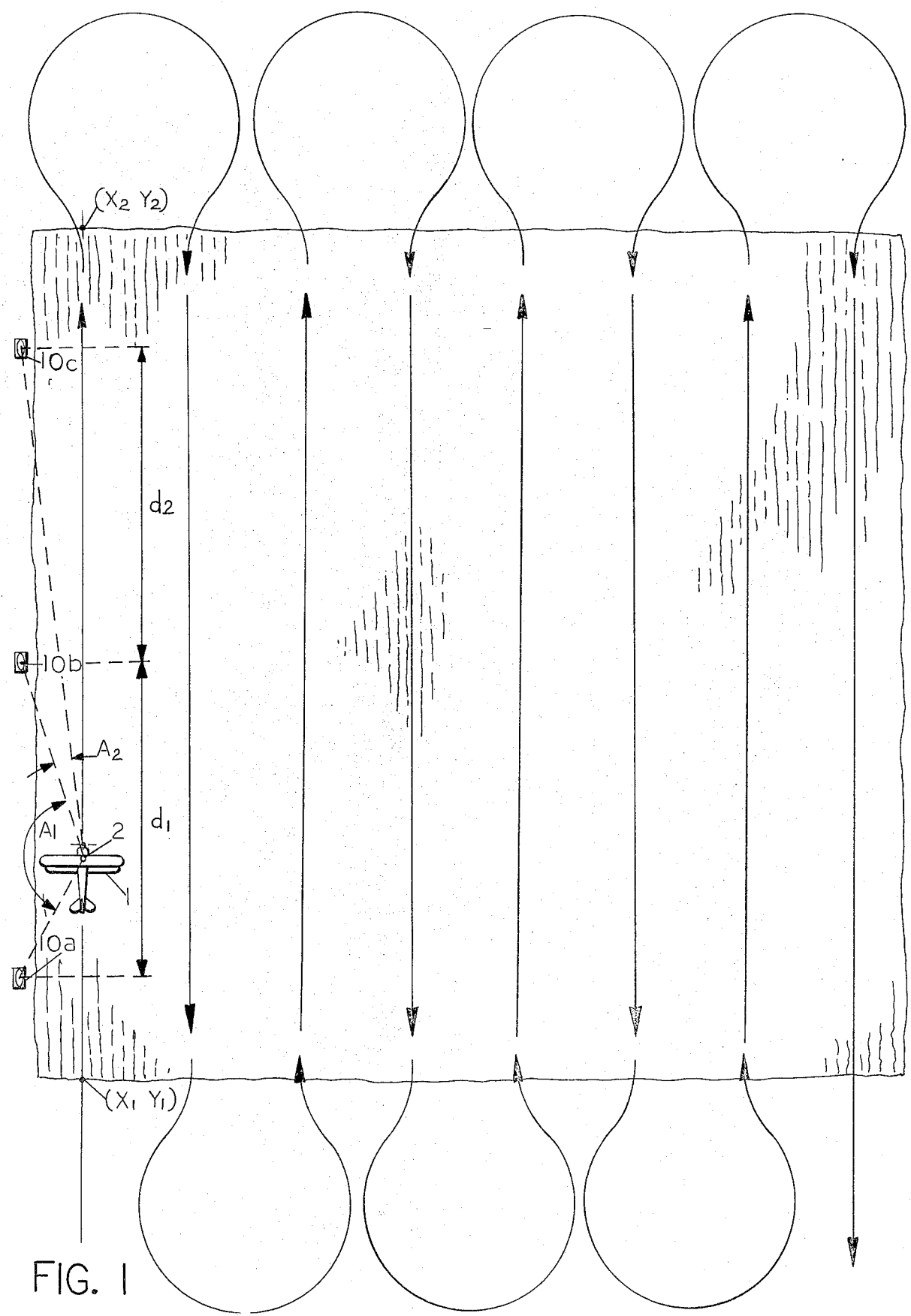
FIG. 1 is a schematic plan view of a field to be sprayed, the paths of an aircraft followed in spraying such field by successive adjacent passes, and one possible location of the laser reflectors for controlling the path of such aircraft.
Figure 2:
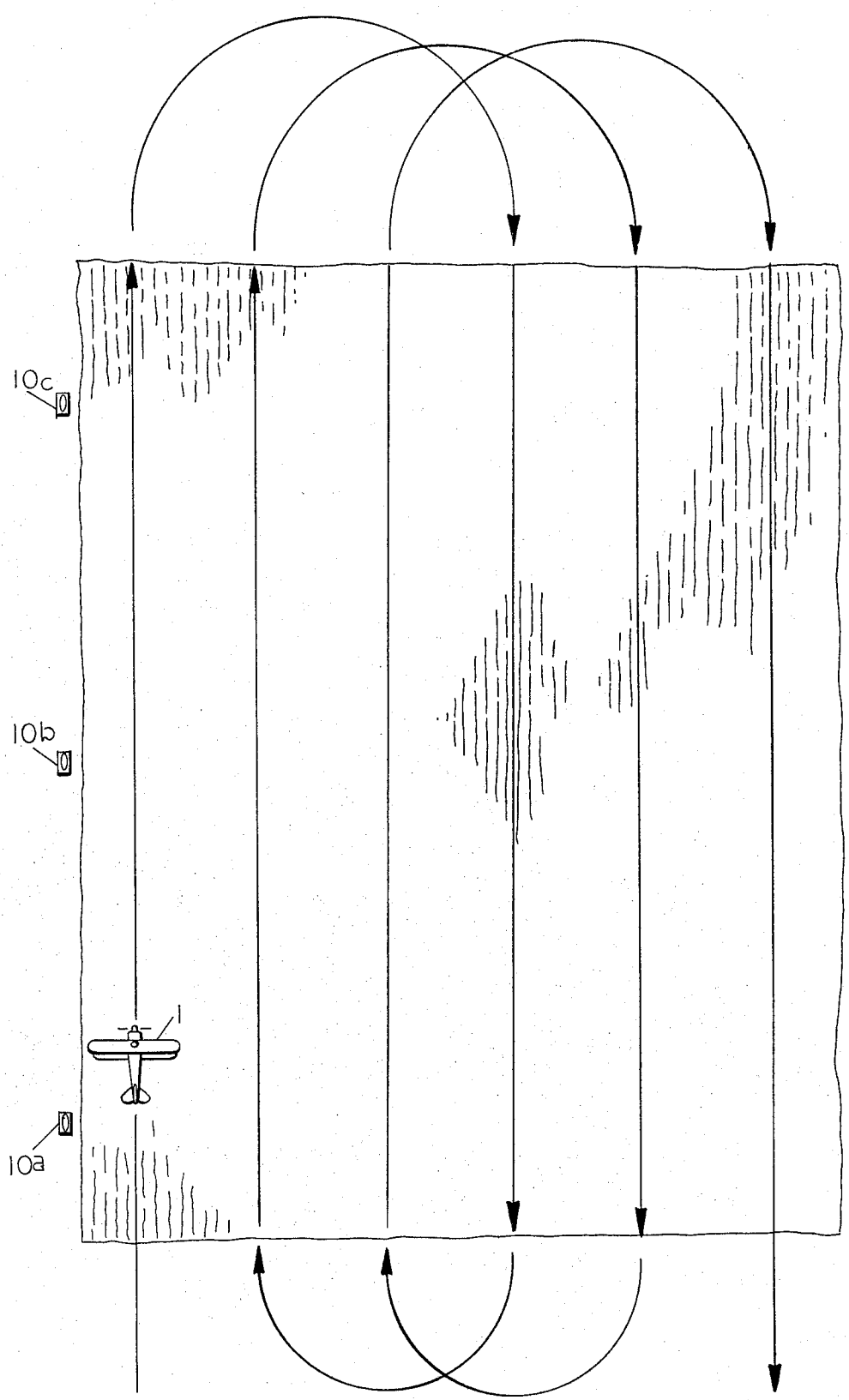
FIG. 2 is a view similar to FIG. 1 but illustrating a modified type of traverse of the field by the aircraft involving U-shaped end turns instead of the keyhole-shaped turns required in the modification of FIG. 1.

In all modifications of this invention, a plurality of reflecting markers 10a, 10b, and 10c are provided in the vicinity of the field. The markers may be positioned at any known location relative to the field but must be in a straight line with respect to one another. In FIGS. 1 and 2, the markers are positioned along one edge of the field substantially parallel to the desired flight path but such a placement is not required in order to practice the present invention. Referring to FIGS. 1 and 5, it is then apparent that anytime an aircraft 1 is traversing the field at a known height and scanning the area around and beneath the aircraft with a rotating laser beam, triangular or fan shaped in a vertical plane, the reflected laser beam from the markers received by the aircraft define Angles $A_1$ and $A_2$ between the lines drawn from the aircraft pickup or sensing point 2 of the reflected beams and the respective reflecting markers 10a, 10b, and 10c.

Figure 3:
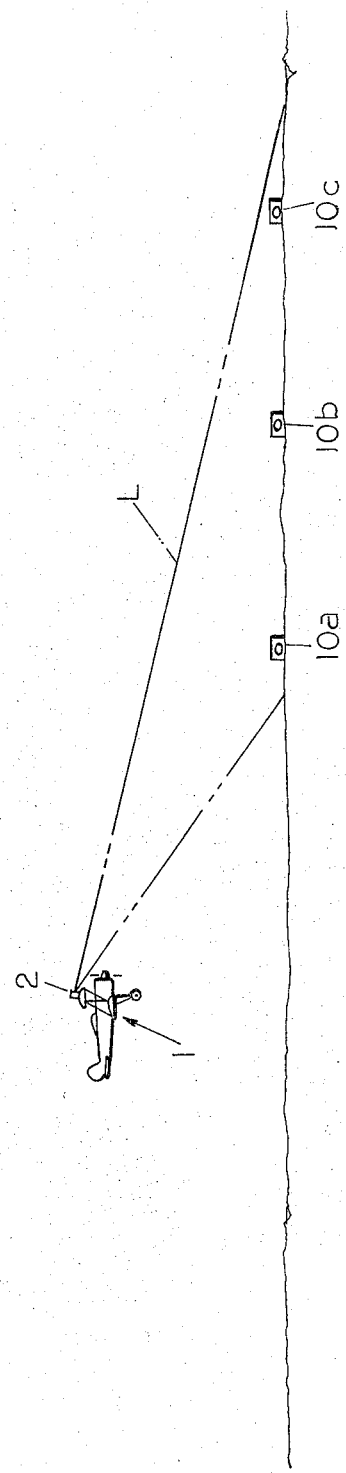
FIG. 3 is a schematic elevational view of both FIG. 1 and FIG. 2.

Referring to FIG. 1, the crop spraying aircraft 1 is shown as having mounted thereon in an elevated position a combined laser beam transmitter and receiving device 2. Such device may be of the type disclosed and claimed in the co-pending application of Richard Davidson, Ser. No. 974,370, filed concurrently herewith and assigned to the same assignee of this invention. Such device is capable of generating a fan-shaped laser beam L as shown in FIG. 3 which rotates about a normally vertical axis, when the aircraft is horizontal. Of course, if greater cost is not objectionable, a gyro-controlled mount for device 2 could be provided on the aircraft which would maintain the rotating axis of the laser beam L on the true vertical.

The same device 2 is capable of receiving reflected laser beams from a plurality of target reflectors 10a, 10b, and 10c which are placed in a line adjacent to the field and at known distances $d_1$ and $d_2$ relative to each other and to the field. Such reflectors are of the type commonly known as a retroreflector and may constitute a glass prism, in the shape of a pyramid formed of identical equilateral triangles, on which the transmitted laser beam is incident. Such reflectors have the property of reflecting back any incident beam directly along the same line as the beam was received, hence assuring that the reflected beam returns to the transmitter-receiver 2 mounted on the aircraft 1.

As disclosed in said co-pending application Ser. No. 974,370, the respective reflected beams from retroreflectors 10a, 10b, and 10c are utilized to generate electrical signals, and the angles $A_1$ and $A_2$ between the aircraft and the reflectors 10a, 10b and 10c are respectively measured. Knowing the angle between the respective reflected beams and the spacing between the respective reflectors, it is possible by application of ordinary trigonometric formulas to compute the position of the aircraft with respect to the reflectors and/or the field. The transmitter-receiver 2 is responsive to each reflection for generating a reflection signal to a timing circuit 11 shown in FIG. 4. The transmitter-receiver 2 includes an incremental angle encoder 13 which generates pulses representing predetermined increments of rotation of the beam to a pair of memories 12a and 12b. In response to the reflection from the reflector 10a, the transmitter-receiver 2 generates a reflection signal to the timing circuit 11 which enables the memory 12a to count pulses from the angle encoder 13. In response to a reflection from the reflector 10b, the transmitter-receiver 2 generates a reflection signal to the timing circuit 11 which disables the memory 12a and enables the memory 12b. In response to a reflection from the reflector 10c, the transmitter-receiver 2 generates a reflection signal to the timing circuit 11 which disables the memory 12b. The memories 12a and 12b have stored therein count totals representing the angle A, between the reflectors 10a and 10b and the angle $A_2$ between the reflectors 10b and 10c respectively. The timing circuit 11 is also responsive to the reflection from the reflector 10c to generate a signal to a microprocessor 14 which responds by reading the angles from the memories 12a and 12b. The microprocessor 14 has stored therein $d_1$ and $d_2$, the spacing between the reflectors. Of course, the memories 12a and 12b are reset by the timing circuit 11 each time a new count is to be made.

In order for the microprocessor to compute the position of the aircraft, the pilot must make an initial pass over the field to establish the spray path. As shown in FIG. 1, the airplane 1 crosses the lower edge of the field at a point having Cartesian coordinates $(X_1 Y_1)$ with respect to any selected intersection of two axes such as a line drawn through the reflectors and a line perpendicular thereto. The airplane crosses the upper edge of the field at a point having Cartesian coordinates $(X_2 Y_2)$. If the microprocessor is signalled when the airplane is over these two points, such as by the actuation and deactuation of the control for the spray, the microprocessor can store the position of the initial path with respect to the reflectors and can calculate the rest of the desired paths. These calculations will be in the form of the angular relationship between the airplane and the reflectors.

Referring to FIG. 5, the microprocessor has stored therein the distances $d_1$ and $d_2$ and receives the values for the angles $A_1$ and $A_2$. Utilizing the trigonometric relationships defined by the triangle having sides $d_1$, $d_3$ and $d_4$ and angles $A_1$, $A_3$ and $A_4$ and the triangle having sides $d_2$, $d_4$ and $d_5$ and angles $A_2$, $A_5$ and $A_6$, the distance D between the airplane and the line of reflectors can be found in terms of the distances $d_1$ and $d_2$ and the angles $A_1$ and $A_2$. The equation is $D=(d_1+d_2)d_1d_2 \sin A_1 \sin A_2 \sin (A_1+A_2)/(d_1^2 \sin^2 A_2 + d_2^2 \sin^2 A_1 - 2d_1d_2 \sin A_1 \sin A_2 \cos (A_1+A_2))$. Each time a new set of values for the angles $A_1$ and $A_2$ is counted, the microprocessor calculates a new value for the distance D which can be compared with a desired distance for the selected traverse path.

The microprocessor 14 is programmed to produce error signals representing departure of the aircraft from any selected one of a number of potential flight paths of the aircraft over the field to be sprayed. For example, if there are no aerial obstructions at the end of the field and relatively sharp keyhole type turns can be made as illustrated in FIG. 1, a button 14a on the microprocessor will be actuated by the operator to select a program corresponding to the key-hole type traverse path. Additionally, buttons 14c, 14d, and 14e are provided which permit the operator to select a spacing between the successive traverse paths of, for example, 30, 40, or 50 feet or any other pre-selected lateral spacing of the successive paths that is desired. Similarly, a button 14b on the microprocessor 14 is available to the aircraft operator which would program the microprocessor to generate error signals proportional to the aircraft departure from successive traverses accomplished in the manner illustrated in FIG. 2, wherein a relatively large U-shaped turn is made at the end of the field and the aircraft comes back over the field with a large spacing between successive traverses. Having completed the return traverse, the aircraft makes another U-turn and traverses the field in the original direction, but this time at the selected spacing of 30, 40, or 50 feet from the original traverse. In all cases, when the selection of type of field traverse has been made by the operator, and the desired spacing of the adjacent traverses has been selected by pushing one of buttons 14c, 14d, or 14e, the microprocessor functions to generate error signals to indicate to the aircraft operator whether the aircraft should be steered to the right or left in order to coincide with the selected path of traverse. Such error signal could, for example, be a pair of red and orange lights, with the illumination of the red light indicating that steering of the aircraft to the left is required, and the orange light that steerings to the right is required. A green light could be illuminated if the aircraft is on course.

Alternatively, the error signal could be in the form of an audio signal which is respectively supplied to the right ear or the left ear of the pilot depending on the direction of the correction required. Or an audio signal comprising short beats for a right direction correction, long beats for a left direction correction and a continuous tone indicating when you are exactly on course, could be utilized. All of these types of error indicating signaling devices are well known in the art, hence represented by block 15, and do not require detailed description.

The important point is that merely by setting up three target reflectors 10a, 10b, and 10c at known positions relative to each other, the operator of a crop spraying aircraft can then fly his plane along successive traverses over the field which are accurately spaced relative to each adjacent traverse, thus minimizing the possibility of spraying gaps or overlapping spraying of the field area.

Modifications of this invention will be apparent to those skilled in the art and it is intended that the scope of the invention be limited only as defined by the following claims. The method could obviously be employed to guide planes to a landing strip in foul weather, or to guide land vehicles, but only at distances in which the laser beam could be transmitted and the reflections received. The red, green and orange lights are shown on the operator interface 15 of FIG. 4.

What I claim is:

1. A method of guiding crop spraying aircraft in a desired path across a field, comprising the steps of:

a. locating a plurality of laser reflectors in a linear array in the vicinity of the field with a known spacing between such reflectors;
   b. emitting from the aircraft a laser beam, fan-shaped in a vertical plane and rotating about a vertical axis, thereby periodically traversing said reflectors;
   c. receiving on the aircraft the laser beams reflected from said reflectors;
   d. determining the angular relationship between the reflected laser beams from each successive reflector;
   e. continuously computing from said angular relationships the horizontal position of the aircraft relative to said reflectors; and
   f. continuously comparing the actual horizontal position of the aircraft with a desired horizontal position and generating signals representing any differences therebetween, whereby the aircraft can be returned to the desired horizontal position relative to said reflectors by an aircraft operator utilizing said signals.

2. The method of claim 1 wherein said reflectors are disposed in a line parallel to the desired traverse paths of the plane over the field.

3. The method of claim 1 including the step of making an initial pass across the field to establish the initial horizontal position of the aircraft relative to said reflectors.

4. The method of claim 3 including the step of computing at least one desired horizontal position for said aircraft from said initial horizontal position.

* * * * *

UNITED STATES PATENT AND TRADEMARK OFFICE
CERTIFICATE OF CORRECTION

PATENT NO. : 4,225,226
DATED : September 30, 1980
INVENTOR(S) : Davidson et al.

It is certified that error appears in the above-identified patent and that said Letters Patent are hereby corrected as shown below:

The sentence beginning in line 27 of Column 5 should have been inserted in line 64, Column 4.

Signed and Sealed this

Twenty-seventh Day of January 1981

[SEAL]

Attest:

RENE D. TEGTMEYER

Attesting Officer

Acting Commissioner of Patents and Trademarks